(12) United States Patent
Ke

(10) Patent No.: US 9,643,321 B2
(45) Date of Patent: May 9, 2017

(54) ROBOT CAPABLE OF DANCING WITH MUSICAL TEMPO

(71) Applicant: HON HAI PRECISION INDUSTRY CO., LTD., New Taipei (TW)

(72) Inventor: Chau-Yuan Ke, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/806,938

(22) Filed: Jul. 23, 2015

(65) Prior Publication Data

US 2016/0236353 A1    Aug. 18, 2016

Related U.S. Application Data

(60) Provisional application No. 62/115,655, filed on Feb. 13, 2015.

(51) Int. Cl.
| | |
|---|---|
| *G06F 17/00* | (2006.01) |
| *B25J 13/00* | (2006.01) |
| *B25J 11/00* | (2006.01) |
| *G06K 9/00* | (2006.01) |
| *G10H 1/00* | (2006.01) |
| *G10L 15/22* | (2006.01) |

(52) U.S. Cl.
CPC ......... *B25J 13/003* (2013.01); *B25J 11/0035* (2013.01); *G06K 9/00228* (2013.01); *G10H 1/0008* (2013.01); *G10H 2210/076* (2013.01); *G10L 2015/223* (2013.01); *Y10S 901/01* (2013.01); *Y10S 901/47* (2013.01)

(58) Field of Classification Search
CPC ...... B25J 13/003; B25J 11/0035; B25J 5/007; G06N 3/008; G10H 2210/076; G10H 1/368; A63H 11/00; A63H 2200/00; A63H 3/28; A63H 13/04
See application file for complete search history.

(56) References Cited

U.S. PATENT DOCUMENTS 6,652,351 B1 * 11/2003 Rehkemper ............ A63H 13/02
  446/312
8,777,818 B1 *  7/2014 Tate, Jr. ............... A63B 69/004
  482/83

(Continued)

FOREIGN PATENT DOCUMENTS

TW  201124106 A1  7/2011
TW  201423295 A   6/2014

OTHER PUBLICATIONS

Jia-Hong Gao, et al, "dancing robot", Middle school students website engineering technology papers, www.shs.edu.tw/works/essay/2011/03/20110329 16555372.pdf.

*Primary Examiner* — Joseph Saunders, Jr.
(74) *Attorney, Agent, or Firm* — Steven Reiss

(57) ABSTRACT

A dancing robot includes a play unit, a processor, and a memory. The play unit plays music. The processor analyzes a musical tempo of the music. The memory stores a relationship between different musical tempos and movement patterns of the robot. The robot can move its head, body, and arms in certain movement patterns in time to the music, and if a human face is recognized through a camera of the robot, the robot can be controlled to give the appearance of dancing with the person who has the recognized face.

15 Claims, 5 Drawing Sheets

(56) References Cited

U.S. PATENT DOCUMENTS

2001/0020837 A1* 9/2001 Yamashita ............. B25J 13/003
　　　　　　　　　　　　　　　　　　　　318/567
2003/0069669 A1　　4/2003 Yamaura
2008/0078282 A1* 4/2008 Saijo .................... G10H 1/0008
　　　　　　　　　　　　　　　　　　　　84/611

* cited by examiner

ROBOT CAPABLE OF DANCING WITH MUSICAL TEMPO

FIELD

The subject matter herein generally relates to robotics.

BACKGROUND

Robots have been used to perform a variety of different tasks. Robots have been constructed to assemble devices. Additional robots can be constructed for entertainment.

BRIEF DESCRIPTION OF THE DRAWINGS

Implementations of the present technology will now be described, by way of example only, with reference to the attached figures.

DETAILED DESCRIPTION

Figure 1:
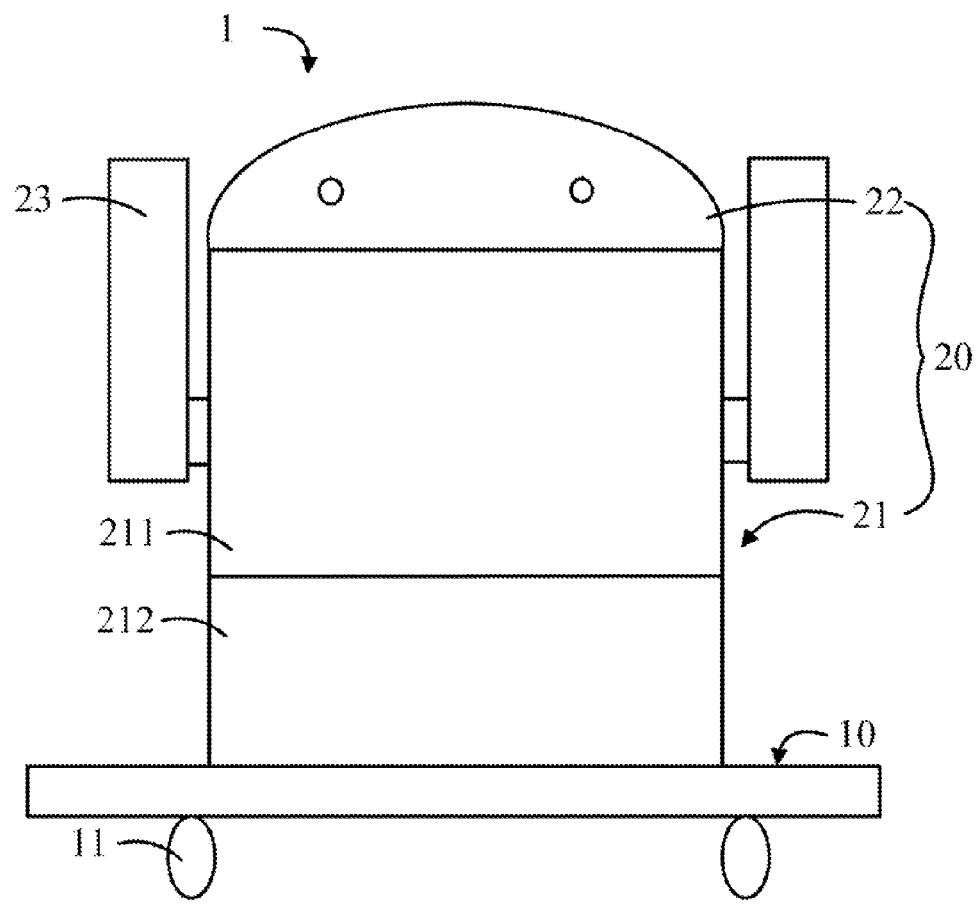
FIG. 1 is a diagrammatic view of an embodiment of a robot according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates an embodiment of a robot 1 comprising a platform 10 and a body 20 located on and secured to the platform 10. The body 20 includes a main body 21, a head 22 secured to a top of the main body 21, and two robotic hands 23 secured to opposite sides of the main body 21.

The platform 10 includes at least two wheels 11 rotatably connected to a bottom surface of the platform 10. The wheels 11 are able to rotate independently with respect to each other, thereby causing the platform 10 to move forwards or backwards, to turn around, or to rotate about a vertical axis of the platform 10.

The main body 21 includes an upper portion 211 and a lower portion 212 movably connected to the upper portion 211. The body 20 is secured to the platform 10 via the lower portion 212. The upper portion 211 is able to move upwards or downwards, tilt in any direction, or turn around, with respect to the lower portion 212. The head 22 is able to tilt or turn around with respect to the upper portion 211. In at least one embodiment, the upper portion 211 includes a first driving member (not shown) configured to drive the upper portion 211 to move upwards or downwards, tilt, or turn around, with respect to the lower portion 212. The head 22 includes a second driving member (not shown) configured to drive the head 22 to tilt or turn around with respect to the upper portion 211.

Figure 2:
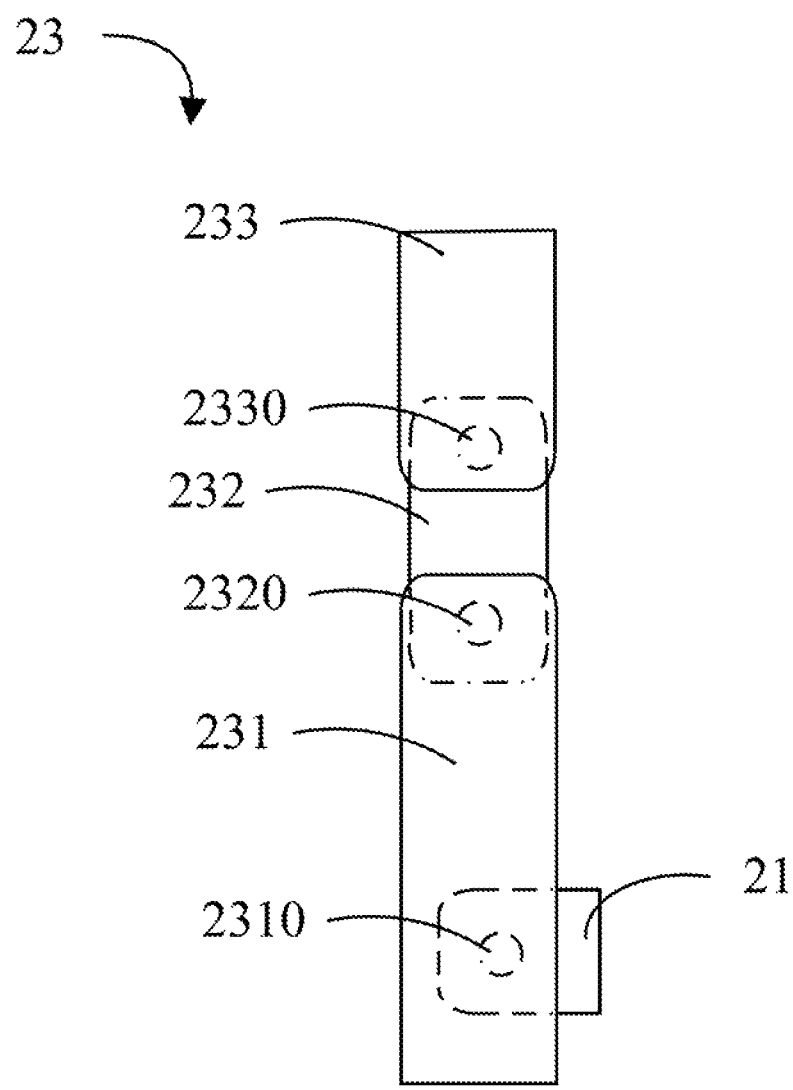
FIG. 2 is a diagrammatic view of a robotic arm included in the robot of FIG. 1.

FIG. 2 illustrates that each robotic arm 23 includes a first connecting member 231, a second connecting member 232, and a third connecting member 233, each being rotatably connected to each other. An end of the first connecting member 231 is rotatably connected to the main body 21 via a first shaft 2310. An opposite end of the first connecting member 231 away from the first shaft 2310 is rotatably connected to an end of the second connecting member 232 via a second shaft 2320. An opposite end of the second connecting member 232 away from the second shaft 2320 is rotatably connected to the third connecting member 233 via a third shaft 2330. A motor 40 (shown in FIGS. 3-5, the motor 40 is assembled inside the robotic arm 23) is connected to each of the first shaft 2310, the second shaft 2320, and the third shaft 2330. The motor 40 can rotate the corresponding one of the first shaft 231, the second shaft 232, and the third shaft 233, thereby causing the robotic arm 23 to move. In at least one embodiment, each of the first shaft 2310, the second shaft 2320, and the third shaft 2330 has only one rotational degree of freedom. In another embodiment, each of the first shaft 2310, the second shaft 2320, and the third shaft 2330 has two rotational degrees of freedom.

Figure 3:
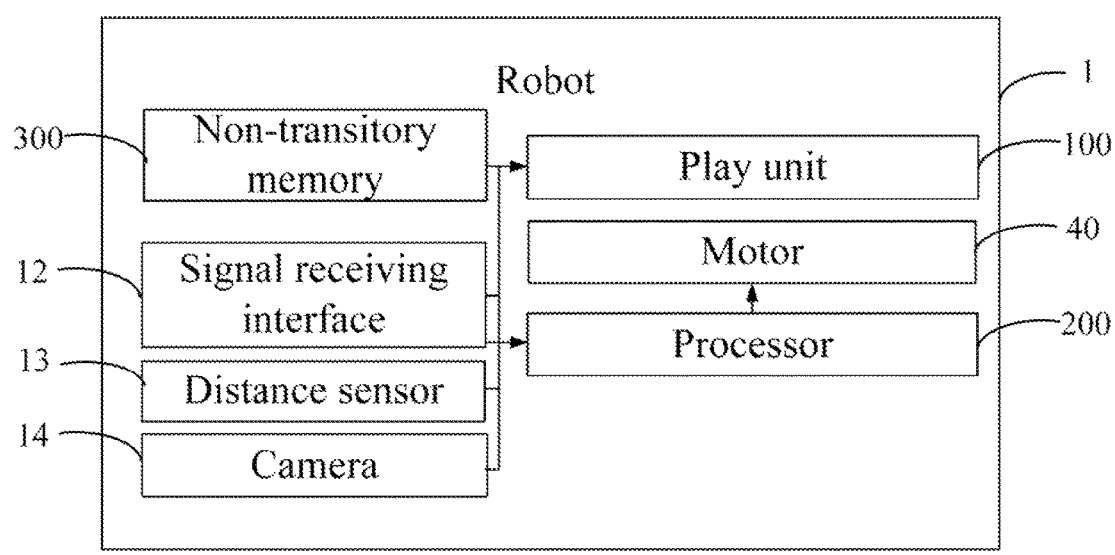
FIG. 3 is a block diagram of the robot of FIG. 1.

FIG. 3 illustrates that the robot 1 further includes a play unit 100, a processor 200, and a non-transitory memory 300. The play unit 100 plays music. The processor 200 analyzes a musical tempo of the music. The memory 300 stores a relationship between different musical tempos and movement patterns of the robot 1. Each musical tempo corresponds to at least one movement pattern of the robot 1. The processor 200 further determines at least one movement pattern corresponding to the analyzed musical tempo, according to the stored relationship, and controls the robot 1 to move accordingly. Therefore, the robot 1 can playback music and dance synchronously with the musical tempo. In at least one embodiment, the play unit 100 is a speaker.

In at least one embodiment, the music to be played is stored in the memory 300. The play unit 100 obtains the music from the memory 300 and plays the obtained music. The movement patterns of the robot 1 include at least one of the movement patterns of the platform 10, the movement patterns of the main body 21, the movement patterns of the head 22, and the movement patterns of each robotic arm 23. The processor 200 thus controls the movement of at least one of the platform 10, the main body 21, the head 22, and the robotic arms 23. The movement patterns of the platform 10 may be that the platform 10 is controlled by the processor 200 to move forwards or backwards, to turn around, or to rotate about the vertical axis of the platform 10. The movement patterns of the main body 21 may be that the upper part 211 is controlled by the processor 200 to move upwards or downwards, to tilt, or to turn around with respect to the lower part 212. The movement patterns of the head 22 may be that the head 22 is controlled by the processor 200 to tilt or turn around with respect to the upper part 211. The movement patterns of each robotic arm 23 may be that at least one motor 40 is controlled by the processor 200 to rotate the first shaft 231, the second shaft 232, and the third shaft 233 of the robotic arm 23.

In at least one embodiment, each musical tempo corresponds to a number of movement patterns of the robot 1 according to the stored relationship. For example, a movement pattern of the platform 10, the robotic arm 23, and the main body 21 can correspond to a musical tempo. When the processor 200 determines a number of movement patterns corresponding to the musical tempo based on the stored relationship, the processor 200 randomly selects one of the determined movement patterns and controls the robot 1 to move according to the selected movement pattern. The robot 1 can play a single piece of music and move in a different movement pattern at different times.

In at least one embodiment, the play unit 100 plays the music when the robot 1 receives a trigger signal. The processor 200 obtains the music from the memory 300 and analyzes the obtained music when the robot 1 receives the trigger signal (that is, when the play unit 100 plays the music). The trigger signal may be generated when a mechanical button (not shown) of the robot 1 is operated by a user.

In another embodiment, the processor 200 obtains the music from the memory 300 and analyzes the musical tempo of the obtained music within a first time period (for example, within five seconds) when the robot 1 receives the trigger signal. Then, the processor 200 determines a movement pattern corresponding to the analyzed musical tempo of the obtained music. After the first time period, the play unit 100 plays the obtained music, and simultaneously the processor 200 controls the robot 1 to move according to the determined movement pattern corresponding to the analyzed musical tempo of the obtained music. The musical tempo of music for a next time period can be analyzed, and a corresponding movement pattern can be determined in advance. That is, before the play unit 100 actually plays a piece of music, the processor 200 can analyze the musical tempo of the piece of music in advance. Then, when the play unit 100 plays the piece of music, the processor 200 can control the robot 1 to move instantly according to a movement pattern corresponding to the analyzed musical tempo. As such, the robot 1 can move in correspondence to a current musical tempo.

For example, the processor 200 analyzes the musical tempo of the music within a first period of five seconds in advance. After the period of first five seconds, the play unit 100 plays the music and the processor 200 controls the robot 1 to move simultaneously according to a movement pattern during the first period of five seconds. The music tempo of music for a second period of five seconds is analyzed, and a corresponding movement pattern is determined in advance. After a second period of five seconds, the play unit 100 plays the music within the second period of five seconds, and simultaneously, the processor 200 controls the robot 1 to move according to the movement pattern determined during the second period of five seconds.

In yet another embodiment, the processor 200 analyzes the musical tempo of all the music in advance, and also determines in advance the movement pattern corresponding to the analyzed musical tempo. As such, when the robot 1 receives the trigger signal, the play unit 100 plays the music, and simultaneously, the processor 200 controls the robot 1 to move according to the determined movement pattern. That is, the robot 1 can move in correspondence to a current musical tempo.

Figure 4:
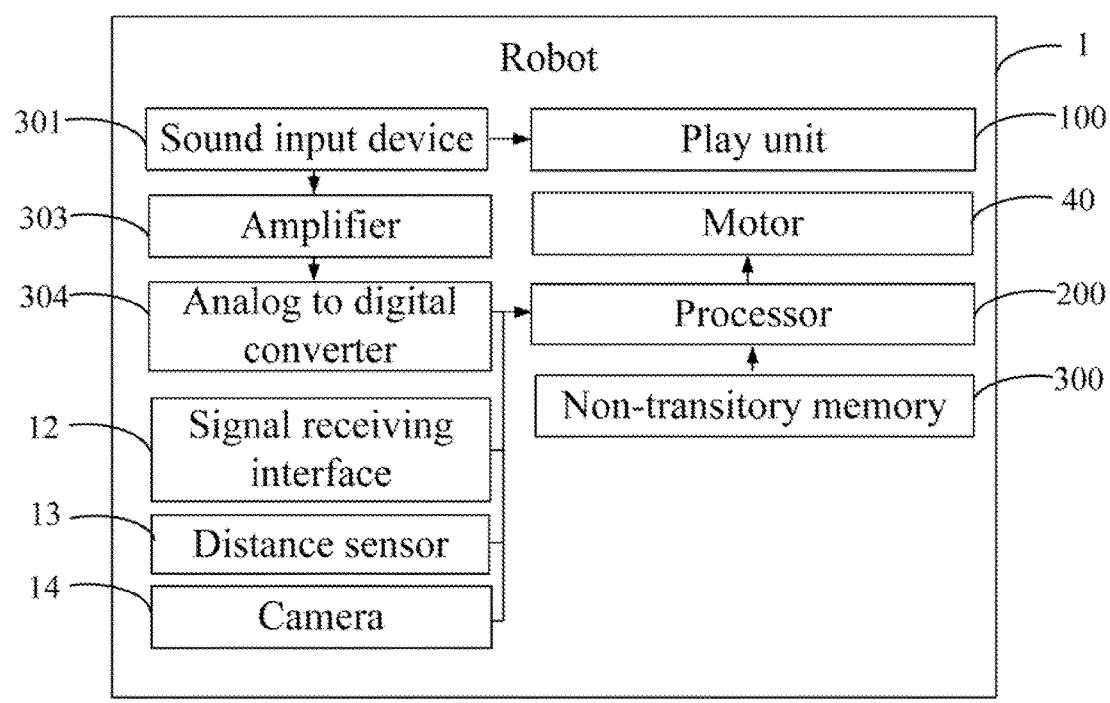
FIG. 4 is a block diagram of a robot including additional and/or alternative components as compared to FIG. 3.
Figure 5:
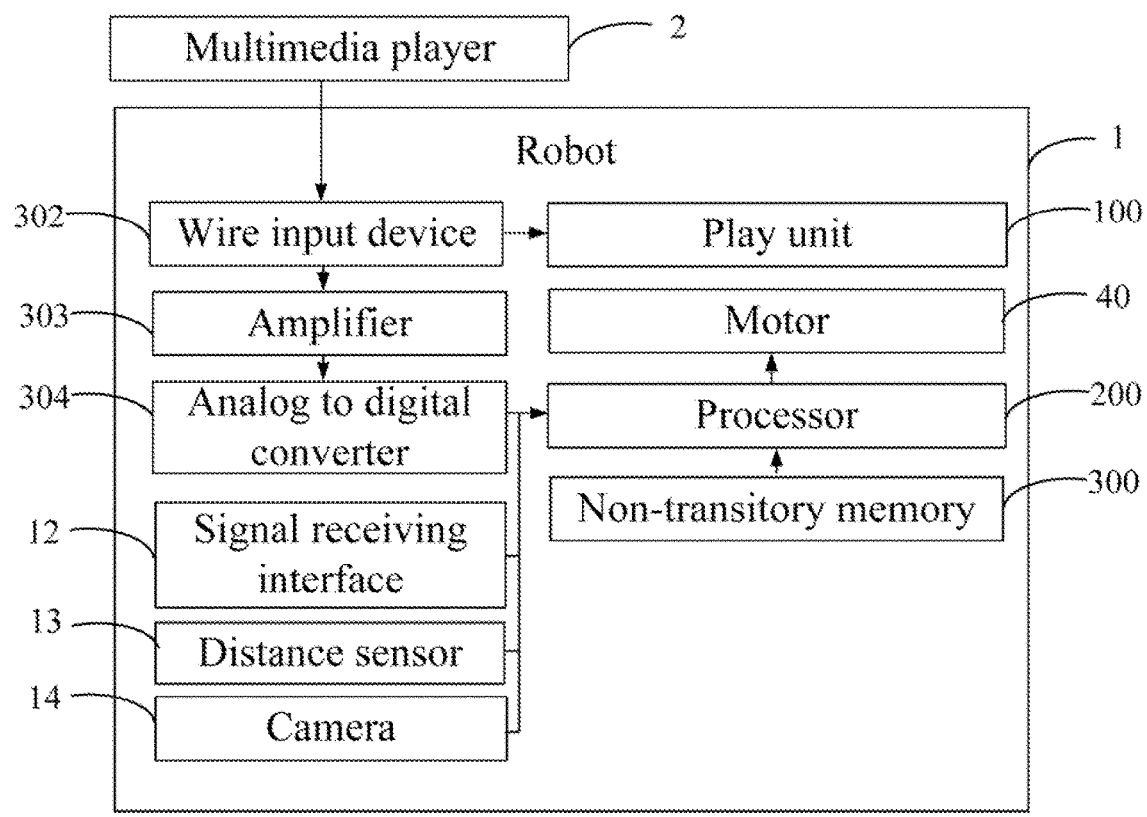
FIG. 5 is a block diagram of a robot including additional and/or alternative components as compared to FIG. 3.

The memory 300 may have no stored music, and the music heard from the play unit 100 may not have been obtained from the memory 300. FIG. 4 illustrates that in another embodiment, the robot 1 further includes a sound input device 301 configured to receive music around the robot 1. FIG. 5 illustrates that in yet another embodiment, the robot 1 further includes a wire input device 302 electrically connected to a multimedia player 2 (for example, an MP3 player or an MP4 player) and configured to receive music from the multimedia player 2. The play unit 100 is electrically connected to the sound input device 301 or the wire input device 302, and plays the music in analog form from the sound input device 301 or the wire input device 302.

The robot 1 may further include an amplifier 303 and an analog to digital converter 304. The amplifier 303 is electrically connected to the sound input device 301 or the wire input device 302, and amplifies the music. The analog to digital converter 304 is electrically connected to the amplifier 303, and converts the amplified music into music in digital form which is then analyzed by the processor 200. The play unit 100, the sound input device 301, and the wire input device 302 may be secured to the head 22 or the main body 21. The processor 200, the amplifier 303, and the analog to digital converter 304 may be secured inside the main body 21.

When the robot 1 includes the sound input device 301, the sound input device 301 can receive commands from a user. The processor 200 can further identify a meaning of the audio command, and controls the robot 1 to move according to the identified meaning.

In at least one embodiment, the platform 10 further includes a signal receiving interface 12 configured to receive a signal from a remote control (not shown). The processor 200 controls the platform 1 to move according to the received signal. The signal receiving interface 12 may be secured to the main body 21.

In at least one embodiment, the robot 1 further includes a distance sensor 13 configured to sense a distance between the robot 1 and an object (for example, a user or an obstacle) in front of the robot 1. The processor 200 further controls the platform 10 to move away from the object when the detected distance is less than a preset distance. The distance sensor 13 may be secured to the head 22 or the main body 21.

In at least one embodiment, the robot 1 further includes a camera 14 configured to periodically capture an image. The processor 200 can further identify whether the captured image includes a human face, and if so compare the identified human face with a number of reference human faces. The processor 200 can determine whether the identified human face matches any one of the reference human faces, and control the platform 10 to move towards a recognized human face, and to move away from an unrecognized human face. In another embodiment, the processor 200 further determines a distance between the robot 1 and the recognized human face, and controls the platform 10 to maintain a preset distance between the robot 1 and the recognized human face. Therefore, when the user with a recognized human face moves towards or away from the robot 1, the processor 200 can control the platform 10 to move away from or towards the user, to allow the robot 1 to appear to dance with such user.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A robot comprising:

a non-transitory memory for storing music to be played;

a play unit configured to obtain the music from the memory and play the obtained music; and a processor configured to configured to obtain the music from the memory and analyze a musical tempo of the obtained music;

the memory further for storing a relationship between different musical tempos and movement patterns of the robot, each musical tempo corresponding to at least one movement pattern of the robot;

the processor further configured to determine at least one movement pattern corresponding to the analyzed musical tempo according to the stored relationship and to control the robot to move according to the determined movement pattern;

wherein the processor is configured to analyze the musical tempo of the obtained music within a first time period when the robot receives a trigger signal and determine at least one movement pattern corresponding to the analyzed musical tempo of the obtained music; after the first time period passes, the play unit is configured to play the obtained music, and simultaneously the processor is configured to control the robot to move according to the determined movement pattern corresponding to the analyzed musical tempo of the obtained music, analyze the musical tempo of music for a next time period, and determine a corresponding movement pattern in advance, thereby allowing the processor to analyze the musical tempo of a piece of music in advance before the play unit actually plays the piece of music, and to control the robot to move instantly according to a movement pattern corresponding to the analyzed musical tempo when the play unit plays the piece of music.

2. The robot of claim 1, further comprising a platform and a body, wherein the body is located on and secured to the platform; the body comprises a main body, a head secured to a top of the main body, and two robotic hands secured to opposite sides of the main body; the movement patterns of the robot comprise at least one of the movement patterns of the platform, the movement patterns of the main body, the movement patterns of the head, and the movement patterns of each robotic arm; the processor is thus configured to control a movement of at least one of the platform, the main body, the head, and the robotic arms.

3. The robot of claim 2, wherein each musical tempo corresponds to a plurality of movement patterns of the robot according to the stored relationship; when the processor determines a plurality of movement patterns corresponding to the analyzed musical tempo according to the stored relationship, the processor is configured to randomly select one of the determined movement patterns, and control the robot to move according to the selected movement pattern.

4. The robot of claim 2, wherein the platform comprises at least two wheels rotatably connected to a bottom surface of the platform; the at least two wheels are able to rotate independently with respect to each other, thereby causing the platform to move forwards or backwards, turn around, or rotate about a vertical axis of the platform.

5. The robot of claim 2, wherein the main body comprises an upper portion and a lower portion movably connected to the upper portion; the body is secured to the platform via the lower portion; the upper portion is able to move upwards or downwards, tilt, or turn around, with respect to the lower portion; the head is able to tilt or turn around with respect to the upper portion.

6. The robot of claim 2, wherein each of the two robotic arm comprises a first connecting member, a second connecting member, and a third connecting member rotatably connected to each other; an end of the first connecting member is rotatably connected to the main body via a first shaft; an opposite end of the first connecting member away from the first shaft is rotatably connected to an end of the second connecting member via a second shaft; an opposite end of the second connecting member away from the second shaft is rotatably connected to the third connecting member via a third shaft; a motor is connected to each of the first shaft, the second shaft, and the third shaft, and is able to rotate the corresponding one of the first shaft, the second shaft, and the third shaft, thereby causing the robotic arm to move.

7. The robot of claim 2, further comprising a sound input device, wherein the sound input device is configured to receive music around the robot; the play unit is electrically connected to the sound input device, and is configured to play the music in analog form from the sound input device.

8. The robot of claim 7, further comprising an amplifier and an analog to digital converter, wherein the amplifier is electrically connected to the sound input device, and is configured to amplify the music; the analog to digital converter is electrically connected to the amplifier, and is configured to convert the amplified music into music in digital form which is then analyzed by the processor.

9. The robot of claim 7, wherein the sound input device is further configured to receive an audio command from a user; the processor is further configured to identify a meaning of the audio command, and control the robot to move according to the identified meaning.

10. The robot of claim 2, further comprising a wire input device, wherein the wire input device is electrically connected to a multimedia player and configured to receive music from the multimedia player; the play unit is electrically connected to the wire input device, and is configured to play the music in analog form from the wire input device.

11. The robot of claim 10, further comprising an amplifier and an analog to digital converter; wherein the amplifier is electrically connected to the wire input device, and is configured to amplify the music; the analog to digital converter is electrically connected to the amplifier, and is configured to convert the amplified music into music in digital form which is then analyzed by the processor.

12. The robot of claim 2, further comprising a signal receiving interface, wherein the signal receiving interface is configured to receive a signal; the processor is further configured to control the platform to move according to the received signal.

13. The robot of claim 2, further comprising a distance sensor, wherein the distance sensor is configured to sense a distance between the robot and an object in front of the robot; the processor is further configured to control the platform to move away from the object when the detected distance is less than a preset distance.

14. The robot of claim 2, further comprising a camera, wherein the camera is configured to periodically capture an image; the processor is further configured to identify whether the captured image comprises a human face, compare the identified human face with a plurality of reference human faces, and control the platform to move towards a recognized human face or to move away from an unrecognized human face.

15. The robot of claim 14, wherein the processor is further configured to determine a distance between the robot and the recognized human face, and control the platform to maintain a preset distance between the robot and the recognized human face.

* * * * *